United States Patent [19]
Henning et al.

[11] 4,209,856
[45] Jun. 24, 1980

[54] ACOUSTIC DEVICES

[75] Inventors: Michael L. Henning, Alhampton; Michael J. Pittman, Gillingham, both of England

[73] Assignee: Plessey Handel und Investments AG, Zug, Switzerland

[21] Appl. No.: 867,537

[22] Filed: Jan. 6, 1978

[30] Foreign Application Priority Data

Jan. 8, 1977 [GB] United Kingdom ............ 682/77

[51] Int. Cl.² ............................................. G01S 9/66
[52] U.S. Cl. ............................... 367/87; 367/103; 367/138; 367/905; 181/206; 181/175
[58] Field of Search ............ 340/5 MP, 1 R; 181/175, 181/176, 198, 206, 0.5

[56] References Cited

U.S. PATENT DOCUMENTS

| | | | |
|---|---|---|---|
| 2,000,806 | 5/1935 | White | 340/5 D |
| 2,960,175 | 11/1960 | McMillan | 181/198 |
| 3,199,069 | 8/1965 | Lord et al. | 340/5 MP |
| 3,918,025 | 11/1975 | Koshikawa et al. | 340/5 MP |

*Primary Examiner*—Richard A. Farley
*Attorney, Agent, or Firm*—Fleit & Jacobson

[57] ABSTRACT

An acoustic interferometer is provided which makes use of the Fabry Perot principle and makes use of destructive interference to suppress unwanted wavefronts and width or frequency modulation to 'swing' the interferometer acceptance angle in accordance with a preset or adaptive plan.

8 Claims, 4 Drawing Figures

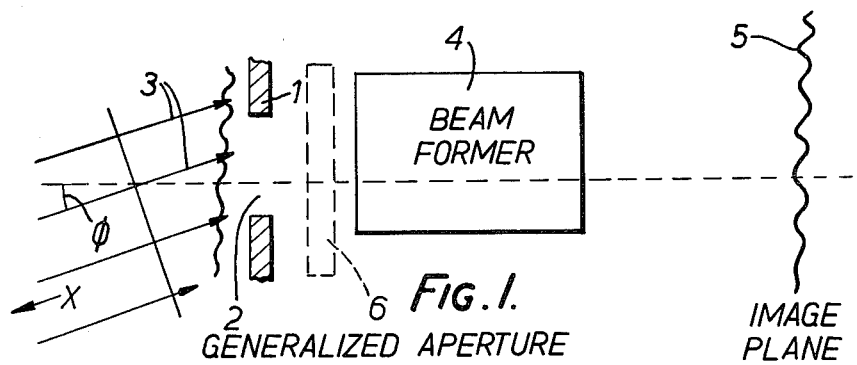
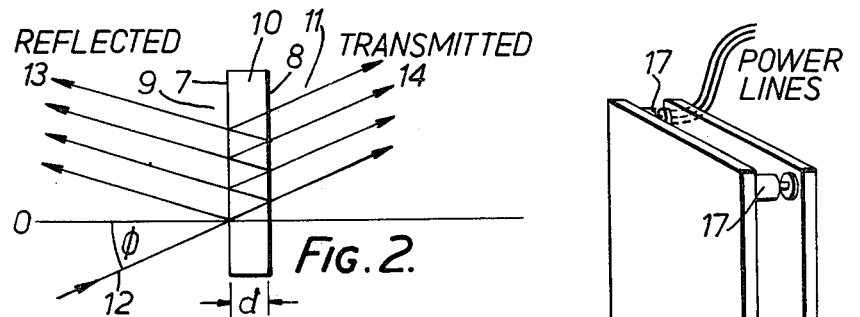
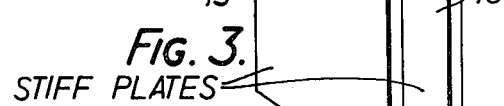
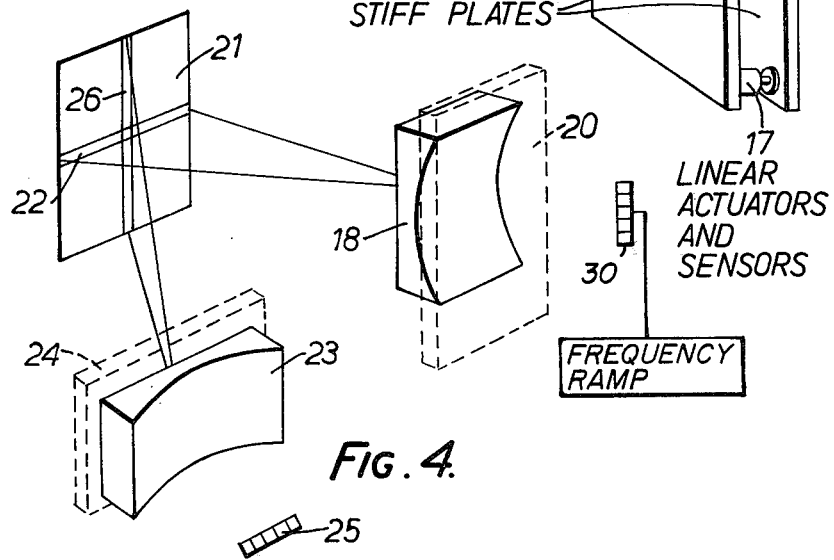

ACOUSTIC DEVICES

This invention relates to acoustic devices and relates more specifically to acoustic interferometers and to devices e.g. acoustic beam formers, acoustic images incorporating such acoustic interferometers. The invention has particular application to acoustic interferometers for use in submersible e.g. underwater applications.

The problems of sidelobe interference in underwater imaging can be eased if suppression of offending wavefronts can be achieved before the beamformer. This is relatively easy to achieve in the cases of electronic beamforming and acoustic holography but is not so easily achieved if geometric or acoustic beamforming is used, using lenses or mirrors as beam formers.

One object of the present invention is to provide an acoustic interferometer for use in underwater imaging applications, as well as in other applications, whereby the problems of sidelobe interference are reduced.

According to the present invention there is provided an acoustic interferometer comprising two spaced apart plane surfaces each defining the boundary between adjacent regions which are acoustic mismatched, the plane surfaces being-in-line with one another in the direction perpendicular to the plane surfaces such that acoustic waves impinging on one of said surfaces are caused to be selectively transmitted or suppressed by said interferometer dependent upon the angle of impingement and in dependence upon the wavelength of the acoustic waves and/or the spacing of said plane surfaces.

In a preferred form of the invention the acoustic interferometer will be for use in submersible applications in which case in one arrangement it may comprise a plate of a material which is acoustically mismatched to the medium in which it is to be submersed, the opposing major surfaces of said plate constituting the plane surfaces of said interferometer and in another arrangement it may comprise two spaced apart plates of a material which is acoustically mismatched to the medium in which the plates are to be submersed, the two plates constituting the plane surfaces of said interferometer.

In carrying out the invention in accordance with the said another arrangement, it may be arranged that means is provided for varying the spacing between the two plates.

It is envisaged that an acoustic interferometer in accordance with the invention may be used as an acoustic beamformer and also may be used in an acoustic imager, the acoustic imager typically comprising an acoustic wave transmitter, a first acoustic wave beamformer for causing acoustic waves generated by said transmitter to impinge an image plane, an acoustic wave receiver, and a second acoustic beamformer for causing acoustic waves received from said image plane to impinge said receiver, in which case each of said beamformers may have an acoustic interferometer disposed in the path of the acoustic waves received by it for reducing the effects of sidelobe interference. The first and second beamformers may advantageously be disposed perpendicularly to one another and operated such that selected points on the image plane may be individually scanned.

The foregoing and other aspects of the invention will now be described by way of example only, reference being made to the accompanying drawings, in which, FIG. 1, depicts diagrammatically part of a typical acoustic imager;

FIG. 2, depicts diagrammatically the principle of operation of an acoustic interferometer according to the present invention;

FIG. 3, is a perspective view of a submersible form of acoustic interferometer in accordance with the present invention, and;

FIG. 4, is a somewhat diagrammatic perspective view of an acoustic imager incorporating an acoustic interferometer in accordance with the present invention.

Considering the acoustic imager depicted in part in FIG. 1 of the drawings, this consists of an aperture plate 1 which has an aperture 2 in it through which is passed acoustic radiation 3 which emanates from a point X effectively at infinity so that the acoustic radiation can be considered as consisting of a set of parallel rays impinging on the aperture 2 at an angle $\phi$. The acoustic radiation 3 passed by the aperture 2 is acted on by a beamformer 4 and is caused to impinge on an image plane 5. Such an arrangement is found in practice to have a low dynamic range due to a large extent to problems from sidelobe interference. One method of increasing the dynamic range is to interpose between the aperture 2 and the beamformer 4 an acoustic interferometer 6 by means of which the effects of the sidelobes may be reduced.

In FIG. 2 of the drawings there is depicted the principle of operation of an acoustic interferometer according to the present invention. The acoustic interferometer shown consists of two spaced apart plane surfaces 7 and 8 each of which defines the boundary between adjacent regions 9,10 and 10,11 which are acoustically mismatched. Acoustic energy 12 which impinges the surface 7 at an angle $\phi$ is, for reasonably small angles of $\phi$ partially reflected, due to the acoustic mismatch and partially transmitted to the surface 8. Similarly, the acoustic energy that is transmitted to the surface 8, is partially reflected by it and is partially transmitted through to the region 11. In this way multiple internal reflections are set up in the region 10, resulting in a reflected interference wavefront 13 and a transmitted interference wavefront 14 being set up. Whether the interference wavefronts 13 and 14 are as a result of constructive or destructive interference is dependent for each angle $\phi$ on the wavelength $\lambda$ of the acoustic waves and the spacing d between the two plane surfaces 7 and 8. By suitable choosing the constants d and $\tau$ for each angle $\phi$ two conditions may be set up dependent upon whether constructive or destructive interference is experienced. These are:

(a) If destructive interference is experienced, the radiation 12 at the angle $\phi$ will be suppressed, and;

(b) If constructive interference is experienced, all angles other than $\phi$ will be suppressed.

Use may be made of these conditions in the acoustic imager of FIG. 1 by inserting the acoustic interferometer between the aperture 2 and the beamformer 4 so that by choosing the spacing d or by choosing the insonifying frequency, such as by the use of adaptive processing any highlight may be suppressed in accordance with condition (a) above or as is more applicable to to the suppression of sidelobe interference all angles other than the required angle $\phi$ may be suppressed in accordance with condition (b) above.

The plane surfaces 7 and 8 of the acoustic interferometer described with reference to FIG. 2 may take any convenient form but in submersible e.g. underwater applications to which the invention is particularly applicable the acoustic interferometer may simply comprise a single plate as depicted in FIG. 2 a stiff material e.g. aluminium, brass or stainless steel coupled to an appropriate electronic multiplexing system. In such a device the spacing d of the surfaces would be fixed whereas in some applications it may be desirable to be able to vary the spacing. This may be achieved by providing an acoustic interferometer of the form shown in FIG. 3 which consists of two stiff plates 15 and 16 which are spaced apart by means of four linear actuators and sensors 17 powered by power lines 18, the linear actuators 17 being located in the corners of the plates such that the spacing between the plates may be varied. As well as changing the spacing d between the plates, it may be arranged that electronic processing e.g. making use of an electronic frequency ramp is also used.

In FIG. 4 of the drawings there is depicted one form of underwater acoustic imager to which the acoustic interferometer of the present invention is particularly applicable. This consists of a multi-aperture acoustic wave transmitter 30 that directs acoustic energy on to a beamformer 18 via an acoustic interferometer shown in dashed lines at 20. The beamformer 18 is arranged and operated so as to cause the vertical axis of an image plane 21 to be scanned in a series of horizontal bands one of which is depicted at 22. Reflected acoustic waves from the image plane are focussed by means of a further beamformer 23 having an acoustic interferometer 24 shown in dashed lines associated with it on to a multi-aperture acoustic wave to receiver 25. It is arranged that the beamformer 23 is disposed perpendicularly to the beamformer 18 and is operated so that the horizontal axis of the image plane 21 is scanned in a series of vertical bands one of which is shown at 26 so that at any particular moment only that part of the image plane at the intersection of the bands 22 and 26 is interrogated. By suitably energising the beamformers 18 and 23, it may be arranged that the whole of the image plane 21 is scanned.

By making use of the acoustic interferometers 20 and 24, sidelobe interference may be greatly reduced thereby increasing the dynamic range of the device.

As well as being of use in acoustic imaging systems it is envisaged that the acoustic interferometers described with reference to FIGS. 2 and 3 may themselves be used as beamformers, the beam width and position being that of the acoustic interferometer and thus a very simple imager or sonar is realisable using a single element array with no image forming or beamforming equipment.

Although described as being particularly applicable to submersible applications there appears to be no conceptional reason why such the acoustic interferometers described cannot be used in conventional sonars or on holographic systems or possibly microwave or radar systems.

What we claim is:

1. An acoustic interferometer arrangement comprising means for transmitting acoustic waves of a predetermined frequency, an acoustic interferometer for receiving said acoustic waves and for preferentially transmitting the waves received from at least one predetermined direction, said interferometer comprising two plane surfaces defining a spacing therebetween, each surface defining a boundary between adjacent regions which are acoustically mismatched, the plane surfaces being in line with one another in a direction perpendicular to the plane surfaces, and adjusting means for adjusting the predetermined frequency to adjust the at least one predetermined direction from which acoustic waves are preferentially transmitted.

2. An acoustic interferometer arrangement as claimed in claim 1 in which the spaced apart surfaces are formed by opposed surfaces of a plate.

3. An acoustic interferometer arrangement as claimed in claim 1 in which the spaced apart surfaces are formed by two spaced apart plates.

4. An acoustic interferometer arrangement as claimed in claim 1 wherein said adjusting means comprises generating means for generating a frequency ramp, the generating means being coupled to the transmitting means to transmit the frequency ramp whereby the predetermined direction from which acoustic waves are preferentially transmitted changes in synchronism with the frequency ramp.

5. An acoustic interferometer as claimed in claim 1 further comprising means for adjusting the spacing between the surfaces.

6. An acoustic interferometer as claimed in claim 5 wherein said spaced apart plane surfaces comprise two spaced apart plates, and wherein said adjusting means further comprises a plurality of linear actuators extending between the plates for varying the spacing therebetween.

7. An acoustic imaging equipment comprising an acoustic wave transmitting means, a first acoustic beam former for causing acoustic waves transmitted by the transmitting means to impinge on an image plane, an acoustic wave receiver and a second acoustic beam former for causing acoustic waves received from said image plane to impinge said receiver, a first acoustic interferometer interposed in an acoustic wave path between the transmitting means and the image plane and a second acoustic interferometer interposed in an acoustic wave path between the image plane and the acoustic wave receiver whereby to suppress side lobe interference.

8. An acoustic interferometer as claimed in claim 7, in which the first and second acoustic beamformers are disposed perpendicularly to one another and operated such that selected points on the image plane may be individually scanned.

* * * * *